US012615664B2

(12) United States Patent
Kiilerich Pratas et al.

(10) Patent No.: US 12,615,664 B2
(45) Date of Patent: Apr. 28, 2026

(54) CONSISTENT LISTEN BEFORE TALK FAILURE RECOVERY PROCEDURE FOR SIDELINK OPERATION IN UNLICENSED BANDS

(71) Applicant: Nokia Technologies Oy, Espoo (FI)

(72) Inventors: Nuno Manuel Kiilerich Pratas, Aalborg (DK); Torsten Wildschek, Gloucester (GB); Renato Barbosa Abreu, Aalborg (DK); Laura Luque Sanchez, Aalborg (DK); Jianguo Liu, Shanghai (CN); Jakob Lindbjerg Buthler, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 216 days.

(21) Appl. No.: 18/478,671

(22) Filed: Sep. 29, 2023

(65) Prior Publication Data

US 2024/0163921 A1 May 16, 2024

(30) Foreign Application Priority Data

Nov. 10, 2022 (WO) ............... PCT/CN2022/131185

(51) Int. Cl.
*H04W 74/0808* (2024.01)
(52) U.S. Cl.
CPC .............................. *H04W 74/0808* (2013.01)
(58) Field of Classification Search
CPC ................................................. H04W 74/0808
See application file for complete search history.

(56) References Cited

U.S. PATENT DOCUMENTS 10,925,093 B2* 2/2021 Jose ...................... H04W 72/02
2019/0373647 A1* 12/2019 Rugeland .......... H04W 72/0446
2022/0201760 A1 6/2022 Ozturk et al.

FOREIGN PATENT DOCUMENTS

WO 2021/097761 A1 5/2021
WO 2021/109480 A1 6/2021
(Continued)

OTHER PUBLICATIONS

"New WID on NR sidelink evolution", 3GPP TSG RAN Meeting #94e, RP-213678, Agenda: 8.6.1, OPPO, Dec. 6-17, 2021, 6 pages.
(Continued)

*Primary Examiner* — Myron Wyche
(74) *Attorney, Agent, or Firm* — SQUIRE PATTON BOGGS (US) LLP

(57) ABSTRACT

Systems, methods, apparatuses, and computer program products for detecting consistent listen before talk failure cases and suitably recovering from such failure cases in the implementation of sidelink for unlicensed bands are provided. For example, a method can include monitoring a transmission resource pool in which the apparatus is operating. The transmission resource pool can include resource block sets, each of which can be monitored. The monitoring can be applied to resource block sets for which a prohibit timer is not running or is expired. The monitoring can be performed to detect listen before talk failures of the apparatus for each monitored resource block set of the plurality of resource block sets. The method can also include triggering or declaring a consistent listen before talk failure for the monitored resource block set when the count value of detected failures exceeds a threshold.

20 Claims, 3 Drawing Sheets

(56)                References Cited

FOREIGN PATENT DOCUMENTS

| WO | 2022/031366 A1 | 2/2022 | |
|----|----|----|----|
| WO | 2022/165851 A1 | 8/2022 | |
| WO | WO2022165851 | * 8/2022 | ........ H04W 74/0808 |

OTHER PUBLICATIONS

"Discussion on LBT impact in SL-U", 3GPP TSG-RAN WG2 #119bis-e, R2-2209386, Agenda: 8.15.2, OPPO, Oct. 2022, pp. 1-8.
"Discussion on consistent LBT failure for SL-U", 3GPP TSG-RAN WG2 #119bis-electronic, R2-2210002, Agenda: 8.15.2, NEC, Oct. 10-19, 2022, 2 pages.
"Discussion on CAPC definition and sidelink LBT failure handling", 3GPP TSG-RAN WG2 #119bis-electronic, R2-2209679, Agenda: 8.15.2, ZTE Corporation, Oct. 10-19, 2022, 5 pages.
"Discussion on RAN2 aspects for SL-U", 3GPP TSG-RAN WG2 #119bis-e, R2-2209464, Agenda: 8.15.2, vivo, Oct. 2022, 6 pages.
"Discussion on LBT for SL-U", 3GPP TSG-RAN WG2 #119bis-e, R2-2209535, Agenda: 8.15.2, Huawei, Oct. 10-19, 2022, 5 pages.

"User plane aspects of sidelink on unlicensed spectrum (SL-U)", 3GPP TSG-RAN WG2 #119bis-e, R2-2209762, Agenda: 8.15.2, Apple, Oct. 10-19, 2022, pp. 1-5.
"Discussion on LBT for sidelink operation on unlicensed spectrum", 3GPP TSG-RAN WG2 #119bis-electronic, R2-2210380, Agenda: 8.15.2, Xiaomi, Oct. 10-19, 2022, 5 pages.
"LBT Impacts to MAC Layer", 3GPP RAN WG2 Meeting #119bis electronic, R2-2210257, Agenda: 8.15.2, InterDigital Inc, Oct. 2022, pp. 1-3.
International Search Report and Written Opinion received for corresponding Patent Cooperation Treaty Application No. PCT/CN2022/131185, dated Jul. 26, 2023, 7 pages.
"Handling UL LBT Failures in MAC", 3GPP RAN WG2 Meeting #108, R2-191xxxx, Agenda: 6.2.2.2, InterDigital, Nov. 18-22, 2019, pp. 1-4.
Extended European Search Report received for corresponding European Patent Application No. 23200793.0, dated Mar. 27, 2024, 11 pages.
Canadian Office Action corresponding to CA Application No. 3,268,769, dated Mar. 12, 2026.

* cited by examiner

CONSISTENT LISTEN BEFORE TALK FAILURE RECOVERY PROCEDURE FOR SIDELINK OPERATION IN UNLICENSED BANDS

RELATED APPLICATION

This application claims priority from, and the benefit of, PCT Application No.: PCT/CN2022/131185 filed on Nov. 10, 2022, which is hereby incorporated by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to detecting consistent listen before talk failure cases and suitably recovering from such failure cases in the implementation of sidelink for unlicensed bands.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus may include at least one processor and at least one memory storing instructions. The instructions, when executed by the at least one processor, may cause the apparatus at least to perform monitoring a transmission resource pool in which the apparatus is operating. The transmission resource pool may have a plurality of resource block sets. The monitoring may be performed for each resource block set, of the plurality of resource block sets, for which a prohibit timer is not running or is expired. The monitoring is performed to detect listen before talk failures of the apparatus for each monitored resource block set of the plurality of resource block sets of the resource pool. The instructions, when executed by the at least one processor, may also cause the apparatus at least to perform detecting listen before talk failures of the apparatus for a monitored resource block set of the plurality resource block sets. The instructions, when executed by the at least one processor, may further cause the apparatus at least to perform incrementing a failure counter to a count value. The instructions, when executed by the at least one processor, may additionally cause the apparatus at least to perform starting or restarting a failure detection timer associated with the failure counter. The instructions, when executed by the at least one processor, may also cause the apparatus at least to perform triggering or declaring a consistent listen before talk failure for the monitored resource block set when the count value exceeds a threshold. The instructions, when executed by the at least one processor, may further cause the apparatus at least to perform controlling communication of the apparatus based on the consistent listen before talk failure being triggered or declared.

An embodiment may be directed to a method. The method can include monitoring a transmission resource pool in which the user equipment is operating. The transmission resource pool may have a plurality of resource block sets. The monitoring may be performed for each resource block set, of the plurality of resource block sets, for which a prohibit timer is not running or is expired. The monitoring may be performed to detect listen before talk failures of the user equipment for each monitored resource block set of the plurality of resource block sets of the resource pool. The method may also include detecting listen before talk failures of the user equipment for a monitored resource block set of the plurality resource block sets. The method may further include incrementing a failure counter to a count value. The method may additionally include starting or restarting a failure detection timer associated with the failure counter. The method may also include triggering or declaring a consistent listen before talk failure for the monitored resource block set when the count value exceeds a threshold. The method may further include controlling communication of the user equipment based on the consistent listen before talk failure being triggered or declared.

An embodiment can be directed to an apparatus. The apparatus can include means for monitoring a transmission resource pool in which the apparatus is operating. The transmission resource pool may have a plurality of resource block sets. The monitoring may be performed for each resource block set, of the plurality of resource block sets, for which a prohibit timer is not running or is expired. The monitoring may be performed to detect listen before talk failures of the apparatus for each monitored resource block set of the plurality of resource block sets of the resource pool. The apparatus may also include means for detecting listen before talk failures of the apparatus for a monitored resource block set of the plurality resource block sets. The apparatus may further include means for incrementing a failure counter to a count value and means for starting or restarting a failure detection timer associated with the failure counter. The apparatus may additionally include means for triggering or declaring a consistent listen before talk failure for the monitored resource block set when the count value exceeds a threshold. The apparatus may also include means for controlling communication of the apparatus based on the consistent listen before talk failure being triggered or declared.

BRIEF DESCRIPTION OF THE DRAWINGS

For proper understanding of example embodiments, reference should be made to the accompanying drawings, wherein.

DETAILED DESCRIPTION

Figure 1:
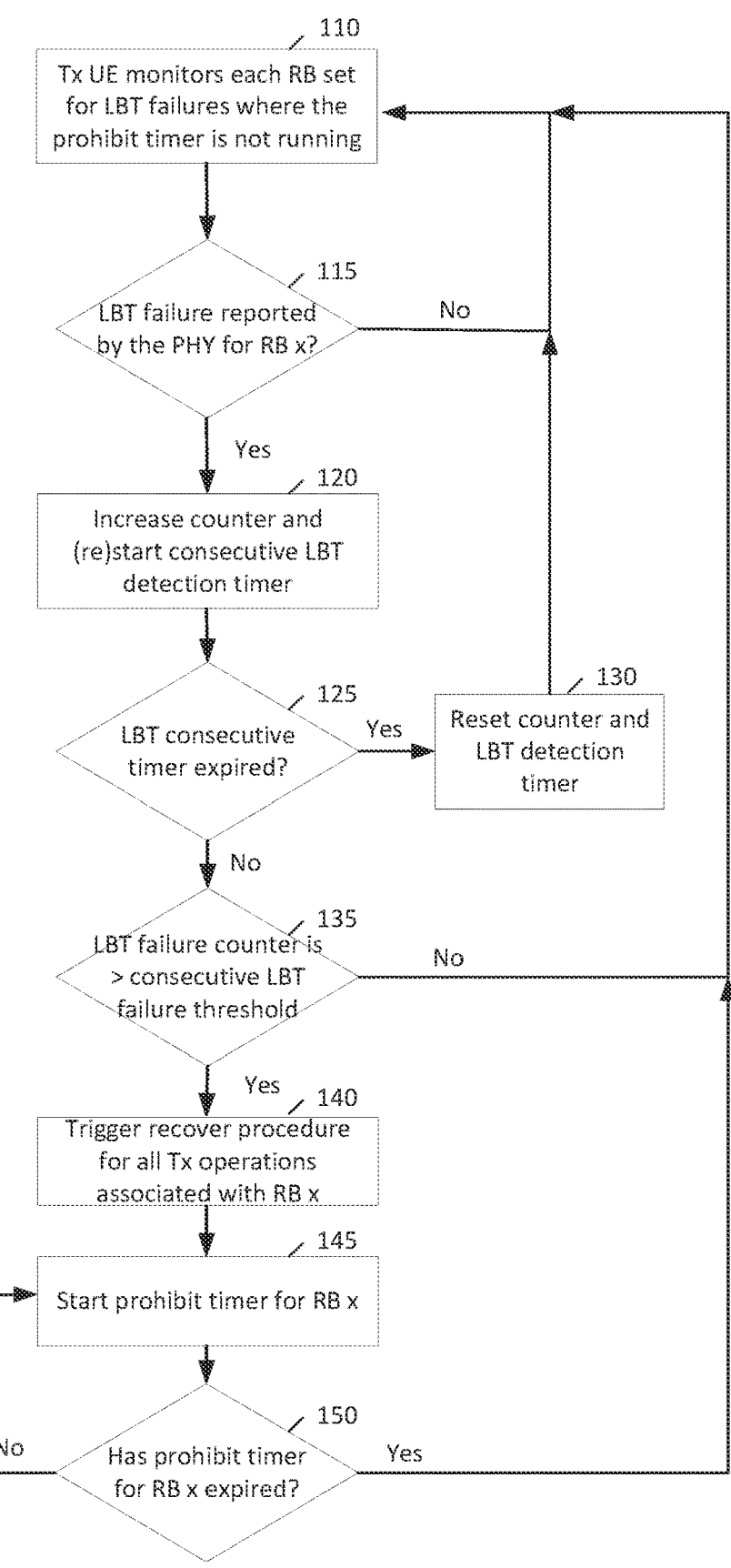
FIG. 1 illustrates a flow chart of a method in a detection phase according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing detecting consistent listen before talk failure cases and suitably recovering from such failure cases in the implementation of sidelink for unlicensed bands, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to sidelink (SL) enhancements, of which sidelink on unlicensed bands (SL-U) is a part. Channel access mechanisms from new radio (NR) on unlicensed bands (NR-U) can be reused for sidelink unlicensed operation. The physical channel design framework may differ, but NR sidelink and NR-U channel structure can be viewed as a baseline.

There may be value in supporting SL-specific consistent listen before talk (LBT) failure detection and recovery procedures in medium access control (MAC) for SL-U. The resource granularity at which an SL-specific LBT failure can be considered as detected may be, for example, per resource pool (RP), per resource block (RB) set, per SL bandwidth part (BWP), or some other resource granularity. At whichever resource granularity consistent LBT failure is declared, there may be benefit in having a procedure to follow to recover from the declared LBT failure.

It may be valuable to support both consistent LBT failure detection and recovery procedure(s). Regarding consistent LBT failure detection, although the high-level description of the detection procedure may involve the use of timers and counters, the granularity of this detection procedure may benefit from suitable selection. For example, the detection procedure could be applied at SL BWP, RB set, RP, or even sub-channel. The scope of the recovery procedure may be highly dependent on the granularity of the detection procedure.

If the granularity is at the SL BWP level, in line with the NR-U's consistent LBT detection granularity, then the outcome of the recovery procedure may be to have the SL device transition to another SL BWP. However, SL-U may only support one SL BWP on a SL-U carrier. Therefore, the only recovery procedure outcome in this case may be to switch to another SL carrier, either unlicensed or licensed. Multi-carrier support has not been introduced into the NR SL design yet. Moreover, LBT failure across different RB sets of a BWP could trigger the consistent LBT failure detection, even though from a perspective of any of these RB sets the LBT failure rate would not be high.

If the granularity is at the RP level, then the outcome of the recovery procedure may be to have the SL device transition to another RP, which can be within the same or different SL carrier. A resource pool can include multiple RB sets. Therefore, LBT failure across different RB sets of a RP could trigger the consistent LBT failure detection, even though from a perspective of any of these RB sets the LBT failure rate would not be high.

Finally, if the granularity is at the RB set level, for example at LBT bandwidth level, then the outcome of the recovery procedure may be to have the SL device to transition to another RB set. Of all the granularities, this may align most closely with the LBT procedure being applied at the RB set level.

From a NR SL mode 1 resource allocation perspective, in which the next generation node B (gNB)) provides the resource allocation, the switching to another RB set where no consistent LBT failure is currently occurring could be triggered upon the serving gNB receiving the consistent LBT failure indication. However, from a NR SL mode 2 resource allocation perspective, in which each SL UE performs its own resource allocation, there may be a need for a way to efficiently and effectively switch to another RB set.

Certain embodiments provide NR SL mode 2 resource allocation enhancements. The enhancements may allow an SL-U UE to recover from consistent LBT failures. More particularly, certain embodiments address a consistent LBT failure detection and recovery procedure for SL-U devices operating in NR SL Mode 2, with the assumption that the consistent LBT failure detection granularity is at the RB set level.

Figure 2:
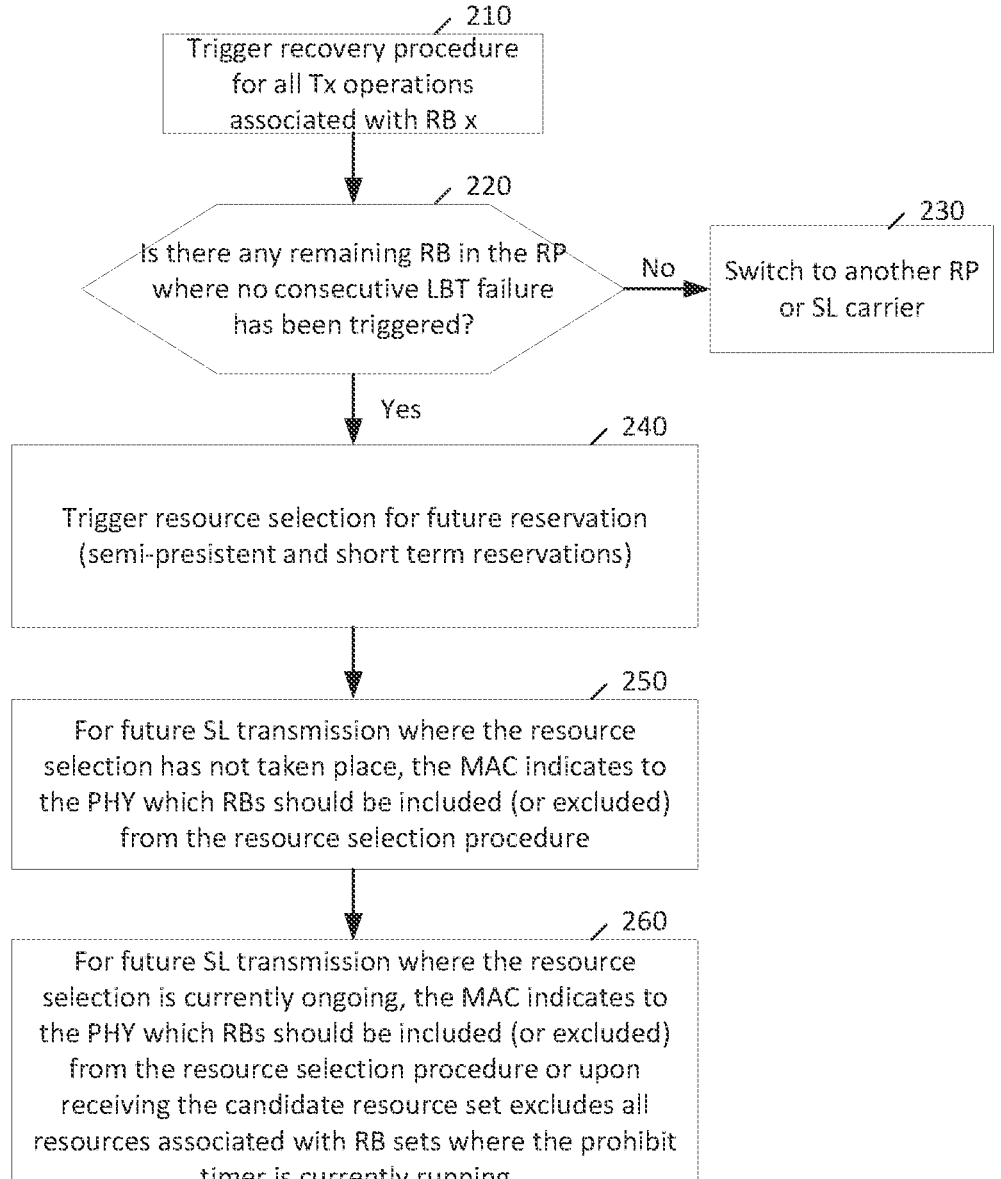
FIG. 2 illustrates a flow chart of a method in a recovery phase according to certain embodiments.

FIG. 1 illustrates a flow chart of a method according to certain embodiments. The method of FIG. 1 focuses on the detection phase of a method. By contrast, FIG. 2 focuses on the recovery phase of the method. Thus, the methods of FIGS. 1 and 2 are usable together.

In the detection phase, the transmission resource pool (RP) in which the SL device is operating can be contained within N RB sets. The detection procedure of FIG. 1 illustrates a procedure using RB x as an example out of the N RBs being monitored. In this phase, consistent LBT failure detection can be performed for each RB set. Initially, the monitoring may be performed at 110 when no consistent LBT failure has been previously detected during a certain time. For example, for the RB sets, the associated sl-LBT-RBsetUseProhibitTimer may be not running or may have expired. This timer may be known as a prohibit timer. The prohibit timer may be associated with an instruction not to use the resource block set associated with the timer, as long as the timer is running.

The SL device can monitor each of the RP's N RB set(s) for LBT failures. For example, every time that the physical layer (PHY) attempts an LBT procedure, whether Type 1 or Type 2, and this procedure does not conclude successfully for transmission in a selected resource within the RB set(s), then the medium access control (MAC) layer can, at 115, receive an indication that an LBT failure has occurred in the corresponding RB set(s).

The failure of the LBT procedure in the context of SL can refer to the SL UE not being able to acquire the channel. For example, the failure can refer to a case where the SL UE fails to complete the LBT procedure before the last allowed starting transmission position associated with the selected resource.

Upon receiving the LBT failure indication from the PHY related to specific RB set(s), at 120 the MAC layer can increment the associated SL-specific LBT failure indication counter, such as SL_LBT_COUNTER, for that RB set(s) and can start or restarts the SL-specific LBT failure detection timer, such as sl-LBT-FailureDetectionTimer.

The failure detection timer may count at an RB set level only or on a resource pool and RB set level. Both the resource pool and RB set can be taken into account for the case where at least two resource pools are multiplexed in time. By contrast, it may be sufficient to count only at the RB set level where the resource pools are multiplexed only in frequency.

Moreover, by using a counter at the resource pool and RB set level, it may be possible to avoid triggering consistent LBT failure in one resource pool based on experiencing consistent LBT failure in another time multiplexed resource pool. This may be beneficial to address the case where the cause of the LBT failures comes from the intra-RAT interaction and therefore may be particularly observed at the resource pool and RB set level.

When the LBT consecutive timer, for example sl-LBT-FailureDetectionTimer, has expired, then at 130, the MAC layer can reset the counter and LBT detection timer at 130, and the device can continue to monitoring.

For each N RB set being monitored, at 135 a determination can be made as to whether the associated SL-specific LBT failure indication counter value is equal to or larger than the SL-specific maximum LBT failure instance count threshold, for example sl-LBT-FailureInstanceMaxCount. If not, monitoring can continue. If the threshold is exceeded, than 140, consistent LBT failure can be triggered or declared by the MAC entity in relation to that RB set.

At 145, the MAC entity can start the sl-LBT-RBsetUseProhibitTimer associated with the RB set where consistent LBT failure has been declared. The system can, at 150, check whether the prohibit timer has expired. If the timer has not expired, the resource block set can remain prohibited, and the prohibit timer can continue counting. Additionally, the sl-LBT-FailureDetectionTimer can be stopped and the counter can be reset. The prohibition timer may ensure that the MAC entity can keep track when the MAC entity can again allow the selection of resources in the RB set where the consistent LBT failure has been declared.

For each N RB set being monitored, the device can, at 135, check whether the SL-specific LBT failure detection timer, for example sl-LBT-FailureDetectionTimer, has expired and the SL-specific LBT failure indication counter, for example SL_LBT_COUNTER, is below the maximum LBT failure instance count threshold, sl-LBT-FailureInstanceMaxCount). If so, the SL-specific LBT failure indication counter, SL_LBT_COUNTER, can be reset to 0.

For each N RB set being monitored, if the maximum LBT failure instance count threshold, for example sl-LBT-FailureInstanceMaxCount, and/or SL-specific LBT failure detection timer, for example sl-LBT-FailureDetectionTimer, is reconfigured, SL-specific LBT failure indication counter, for example SL_LBT_COUNTER, can be reset to 0.

In certain embodiments, if the maximum LBT failure instance count threshold, for example sl-LBT-FailureInstanceMaxCount, is reconfigured to a value higher than the current SL-specific LBT failure indication counter value, the SL-specific LBT failure indication counter, for example SL_LBT_COUNTER, may be kept, rather than being reset to 0, the new configured thresholds can be applied to declare consistent LBT failure. Otherwise, if the current counter is higher than the new configured threshold, the counter may be either reset to 0 or a consistent LBT failure should be declared.

In the same way, if the SL-specific LBT failure detection timer, for example sl-LBT-FailureDetectionTimer, is reconfigured and the elapsed time since the detection timer was started does not exceed the new configured detection timer, SL-specific LBT failure indication counter, for example SL_LBT_COUNTER, may be kept, rather than being reset to 0, and the detection timer may be extended/shortened by a delta equal to the difference between the previous and new configured detection timer. Otherwise, if the elapsed time is larger than the new configure detection timer, the counter may be either reset to 0 or a consistent LBT failure should be declared.

The above-described options may be applied if both parameters are reconfigured simultaneously.

If no consistent LBT failure indication has been triggered by the MAC entity for any of N RB set(s) from the transmission resource pool and if all the timers (e.g. sl-LBT-RBsetUseProhibitTimer) associated with the RB sets where consistent LBT failure has been previously declared have expired, the method can revert to procedure 110.

In certain embodiments, the MAC entity can request the PHY to measure the activity in the RB sets where consistent LBT failure has been declared and, based on the determination of low activity, such as continuous bit rate (CBR) below a threshold in the RB set, to trigger early termination of the sl-LBT-RBsetUseProhibitTimer timer. In certain embodiments, the sl-LBTRBsetUseProhibitTimer may be extended based on the determination of high activity, such as CBR above a threshold in the RB set. These options may be used individually or in combination.

In certain embodiments, there may be no timer and the only condition to declare the RB set as usable again may be that low activity is detected. For example, system may wait for CBR to be below a threshold in the RB set to declare the RB set usable again.

FIG. 2 illustrates a flow chart of a method in a recovery phase according to certain embodiments. As shown in FIG. 2 a recovery procedure can be triggered at 210 for all transmission (Tx) operations associated with RB x. If at least in one of the N RB set(s) the consistent LBT failure has been triggered by the MAC entity and the associated timer, for example sl-LBT-RBsetUseProhibitTimer, has not expired, then further actions can be taken.

In the case where the N RB set(s) is just a single RB set, which has been indicated as recently experiencing LBT failure, or when the consistent LBT failure has been declared in every RB set of the transmission RP, then at the "No," branch from 220 the system may transition to another transmission RP that contains at least one RB set that is not part of the RB sets where consistent LBT failure has been declared. If no alternative transmission RP is available, the system can switch to another SL carrier by triggering a report to the upper layers and/or informing the gNB that an RP switch is required. As another option, the system can trigger an indication of to another frequency of interest, for example using the parameter sl-RxInterestedFreqList from SidelinkUEinformationNR, which can be selected from the list of frequencies sl-FreqInfoList broadcasted on SIB12.

If, however, there is N>1 and there is at least one remaining RB set of the transmission RP where the consistent LBT failure has not been declared, namely the "Yes" branch from 220, then at 240 for future SL transmissions for which a resource has already been selected and this resource is part of the RB set(s) where consistent LBT failure has been declared, the system can trigger resource reselection towards the other RB sets where consistent LBT failure has not been declared, for example where the associated sl-LBT-RBsetUseProhibitTimer is not running. This resource reselection can be triggered only to resources which fulfill one or several of the following: the resources are within the time horizon given by the sl-LBT-RBsetUseProhibitTimer; the resource reservations are indicated via the "Resource reservation period" field in the first stage sidelink control information (SCI) for example for semi persistent transmission, or their previous transmission; the resource reservations have not yet been indicated by a 1st stage SCI; or the resource reservations have been indicated by a 1st stage SCI using the time resource assignment field.

At 250, for future SL transmissions for which a resource has not been selected, for example when the MAC has not yet requested the PHY to initiate the resource selection procedure, the MAC can indicate to the PHY in relation to the resource selection the fields prio_TX, remaining PDB, L_"subCH", and/or P_"rsvp_TX" and can indicate the RB sets from which to select resources or RB sets excluded from the resource selection.

In certain embodiments, if the prohibit timer is closed to expire, the MAC may also indicate the excluded RB sets together with the remaining time of the prohibit timer, so the PHY can also consider such RB sets for resource selection after the prohibit timer expiration.

For future SL transmission for which the resource selection procedure is already ongoing, at 260, the MAC upon receiving the candidate resource set from the PHY, can exclude from the received set all the resources belonging to the RB set where consistent LBT failure has been declared. Also, the MAC can, if no candidate resource set has been received from the PHY, indicate to the PHY the RB sets from which to select resources or the RB sets to be excluded from the resource selection.

In certain embodiments, only traffic from a configured traffic priority, for example of a low PC5 quality indicator (PQI) value, or which are associated to a low L1 priority, may be impeded to be transmitted in the RB-set(s) for which consistent LBT failure indication has been triggered and associated timer, such as sl-LBT-RBsetUseProhibitTimer, has not expired.

Figure 3:
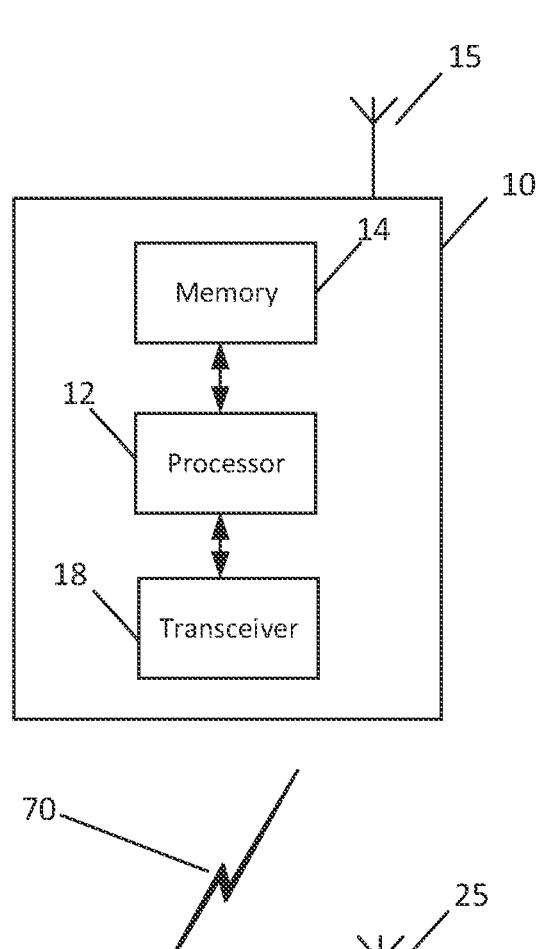
FIG. 3 illustrates an example block diagram of a system, according to an embodiment
Figure 3:
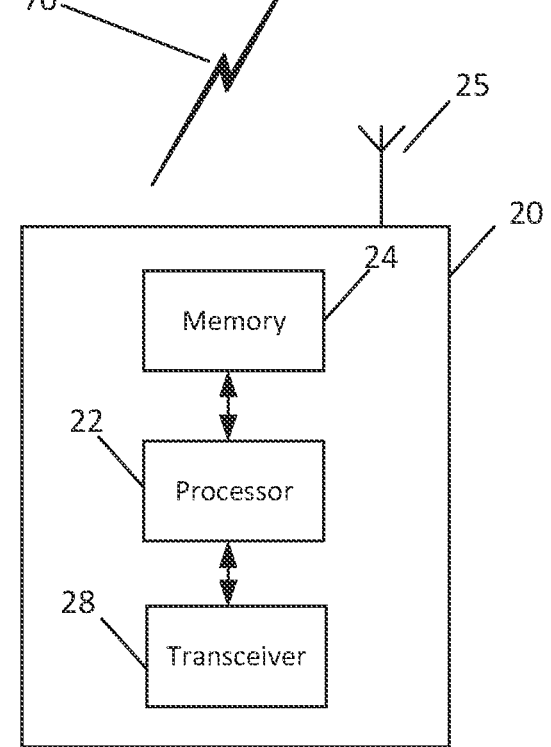

FIG. 3 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as an LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 3.

As illustrated in the example of FIG. 3, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to detecting consistent listen before talk failure cases and suitably recovering from such failure cases in the implementation of sidelink for unlicensed bands.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1 and 2, or any other method described herein. In some embodiments, as discussed herein, apparatus 10 may be configured to perform a procedure relating to providing detecting consistent listen before talk failure cases and suitably recovering from such failure cases in the implementation of sidelink for unlicensed bands, for example.

FIG. 3 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3.

As illustrated in the example of FIG. 3, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1 and 2, or any other method described herein. For example, in an embodiment, apparatus 20 may be controlled to perform a process relating to providing detecting consistent listen before talk failure cases and suitably recovering from such failure cases in the implementation of sidelink for unlicensed bands, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may provide NR SL mode 2 resource allocation enhancements. The enhancements may allow an SL-U UE to recover from consistent LBT failures. More particularly, certain embodiments may address a consistent LBT failure detection and recovery procedure for SL-U devices operating in NR SL Mode 2, even with the assumption that the consistent LBT failure detection granularity is at the RB set level.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium. The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

LBT Listen Before Talk
SL Sidelink
SL-U SL in Unlicensed Band(s)
RP Resource Pool
RB Resource Block
BWP Bandwidth Part
RRC Radio Resource Control
NR New Radio
NR-U NR for Unlicensed Band(s)
gNB Next Generation Node B
MAC Medium Access Control
PHY Physical Layer
CBR Continuous Bit Rate

We claim:
1. An apparatus, comprising:
at least one processor; and
at least one memory storing instructions that, when executed by the at least one processor, cause the apparatus at least to perform:
monitoring a transmission resource pool in which the apparatus is operating, wherein the transmission resource pool has a plurality of resource block sets, wherein the monitoring is performed for each resource block set, of the plurality of resource block sets, for which a prohibit timer is not running or is expired, wherein the monitoring is performed to detect listen before talk failures of the apparatus for each monitored resource block set of the plurality of resource block sets of the transmission resource pool;
detecting listen before talk failures of the apparatus for a monitored resource block set of the plurality resource block sets;
incrementing a failure counter to a count value;
starting or restarting a failure detection timer associated with the failure counter;

triggering or declaring a consistent listen before talk failure for the monitored resource block set when the count value exceeds a threshold; and controlling communication of the apparatus based on the consistent listen before talk failure being triggered or declared.

2. The apparatus of claim 1, wherein the failure counter is configured to count at a listen before talk failure at a resource block set level only or at a transmission resource pool and resource block set level.

3. The apparatus of claim 1, wherein the instructions that, when executed by the at least one processor, cause the apparatus at least to perform starting the prohibit timer for the monitored resource block set based on the consistent listen before talk failure being triggered or declared.

4. The apparatus of claim 1, wherein the instructions that, when executed by the at least one processor, cause the apparatus at least to perform detecting an activity level of the monitored resource block set;

triggering early termination of the prohibit timer based on the activity level being below a threshold.

5. The apparatus of claim 1, wherein the instructions that, when executed by the at least one processor, cause the apparatus at least to perform detecting an activity level of the monitored resource block set;

extending the prohibit timer based on the activity level being above a threshold.

6. The apparatus of claim 1, wherein the instructions that, when executed by the at least one processor, cause the apparatus at least to perform stopping the failure detection timer for the monitored resource block set based on the consistent listen before talk failure being triggered or declared; and resetting the failure counter based on the consistent listen before talk failure being triggered or declared.

7. The apparatus of claim 1, wherein the instructions that, when executed by the at least one processor, cause the apparatus at least to perform determining that each of the plurality of resource block sets in the transmission resource pool has been triggered as consistent listen before talk failure and an associated timer for each respective resource block set is unexpired; and switching to different transmission resources based on the determination.

8. The apparatus of claim 7, wherein the different transmission resources comprise at least one of:

a further transmission resource pool including at least one different resource block set than the transmission resource pool;

a different sidelink carrier from a sidelink carrier of the transmission resource pool; or a different frequency of interest from a frequency corresponding to the transmission resource pool.

9. The apparatus of claim 1, wherein the instructions that, when executed by the at least one processor, cause the apparatus at least to perform determining that a first subset of the plurality of resource block sets in the transmission resource pool has been triggered as consistent listen before talk failure and an associated timer for each respective resource block set of first subset is unexpired, and that a second subset of the plurality of resource block sets in the transmission resource pool has no consistent listen before talk failure that has been triggered or an associated timer for each respective resource block set of second subset is expired; and triggering, for a sidelink transmission for which a resource has been selected and the resource is part of the transmission resource pool, resource selection of a resource block set of the second subset rather than the first subset.

10. The apparatus of claim 9, wherein the triggering is conditioned on a resource being within a time horizon of the prohibit timer associated with the resource.

11. The apparatus of claim 9, wherein the triggering is conditioned on a resource reservation being already indicated via a resource reservation period field in first stage sidelink control information or previous transmission.

12. The apparatus of claim 9, wherein the triggering is conditioned on a resource reservation having not yet been indicated by first stage sidelink control information.

13. The apparatus of claim 9, wherein the triggering is conditioned on a resource reservation having been indicated by first stage sidelink control information using a time resource assignment field.

14. The apparatus of claim 1, wherein the instructions that, when executed by the at least one processor, cause the apparatus at least to perform determining that a first subset of the plurality of resource block sets in the transmission resource pool has been triggered as consistent listen before talk failure and an associated timer for each respective resource block set of first subset is unexpired; and triggering, for a sidelink transmission for which a resource has not been selected, resource selection of a resource block set with an indication of a remaining time of the associated timer for each respective resource block set of first subset.

15. The apparatus of claim 14, wherein the selection is from an indicated inclusion set of resource block sets to select or the selection excludes an indicated exclusion set of resource block sets to exclude from selection.

16. The apparatus of claim 14, wherein a medium access control entity of the apparatus, upon receiving a candidate resource set from a physical layer of the apparatus, excludes from the received candidate resource set all resources belonging to a resource block set where consistent listen before talk failure has been declared and the prohibit timer is running.

17. The apparatus of claim 14, wherein when a medium access control entity of the apparatus has not received a candidate resource set from a physical layer of the apparatus, the medium access control entity indicates to the physical layer an indicated inclusion set of resource block sets from which to select or the selection excludes an indicated exclusion set of resource block sets to exclude from selection.

18. The apparatus of claim 14, wherein the triggered selection of a resource is only impeded based on the prohibit timer being unexpired when a configured traffic priority is below a threshold level.

19. A method, comprising:

monitoring a transmission resource pool in which the user equipment is operating, wherein the transmission resource pool has a plurality of resource block sets, wherein the monitoring is performed for each resource block set, of the plurality of resource block sets, for which a prohibit timer is not running or is expired, wherein the monitoring is performed to detect listen before talk failures of the user equipment for each monitored resource block set of the plurality of resource block sets of the transmission resource pool;

detecting listen before talk failures of the user equipment for a monitored resource block set of the plurality resource block sets;

incrementing a failure counter to a count value;

starting or restarting a failure detection timer associated with the failure counter;

triggering or declaring a consistent listen before talk failure for the monitored resource block set when the count value exceeds a threshold; and controlling communication of the user equipment based on the consistent listen before talk failure being triggered or declared.

20. A non-transitory computer-readable medium comprising program instructions that, when executed by an apparatus, cause the apparatus to perform at least the following:

monitoring a transmission resource pool in which the user equipment is operating, wherein the transmission resource pool has a plurality of resource block sets, wherein the monitoring is performed for each resource block set, of the plurality of resource block sets, for which a prohibit timer is not running or is expired, wherein the monitoring is performed to detect listen before talk failures of the user equipment for each monitored resource block set of the plurality of resource block sets of the transmission resource pool;

detecting listen before talk failures of the user equipment for a monitored resource block set of the plurality resource block sets;

incrementing a failure counter to a count value;

starting or restarting a failure detection timer associated with the failure counter;

triggering or declaring a consistent listen before talk failure for the monitored resource block set when the count value exceeds a threshold; and controlling communication of the user equipment based on the consistent listen before talk failure being triggered or declared.

* * * * *